Figure 2:
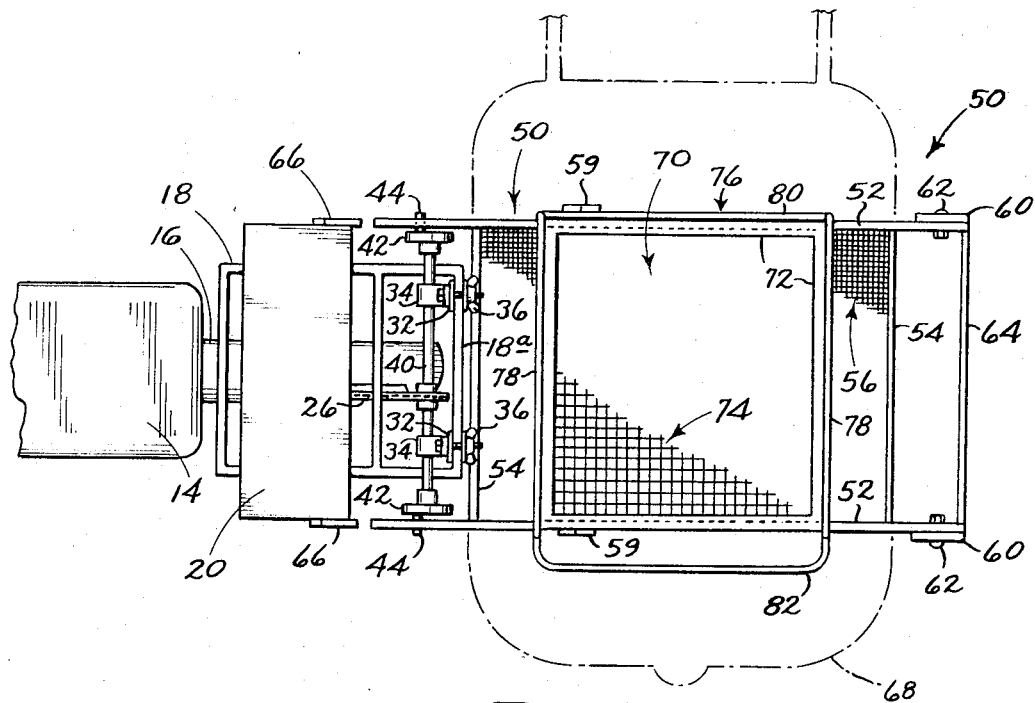

United States Patent
Piper

[15] 3,700,105
[45] Oct. 24, 1972

[54] VIBRATING SCREEN, EARTH-CLASSIFYING MOTORCYCLE ATTACHMENT

[72] Inventor: Delbert A. Piper, Lexington, Oreg. 97839

[22] Filed: July 21, 1971

[21] Appl. No.: 164,514

[52] U.S. Cl. ............................209/421, 180/53 WA
[51] Int. Cl. ...............................................B07b 1/42
[58] Field of Search......209/420, 421, 315, 326, 332, 209/365, 341, 412–414; 280/289; 180/53 A, 53 B, 53 WA, 53 R

[56] References Cited

UNITED STATES PATENTS

| | | | |
|---|---|---|---|
| 907,947 | 12/1908 | Asplund | 209/315 |
| 2,783,698 | 3/1957 | Bambi | 209/420 X |
| 3,142,341 | 7/1964 | Biasi | 209/421 X |

FOREIGN PATENTS OR APPLICATIONS

| | | | |
|---|---|---|---|
| 909,538 | 6/1946 | France | 280/289 |

*Primary Examiner*—Tim R. Miles
*Assistant Examiner*—William Cuchlinski, Jr.
*Attorney*—Eugene D. Farley

[57] ABSTRACT

An earth-classifying motorcycle attachment for use by artifact hunters, etc., comprises a vibrating screen supported on one end by pivoted legs and on the other by an eccentric drive mounted on the rear fender of the motorcycle and connected to the drive wheel of the latter. When the attachment is not in use, the eccentric drive may be disconnected and the screen and legs folded back for transport from place to place.

8 Claims, 2 Drawing Figures

PATENTED OCT 24 1972

3,700,105

Delbert A. Piper
INVENTOR
BY Eugene D. Farley
Atty.

VIBRATING SCREEN, EARTH-CLASSIFYING MOTORCYCLE ATTACHMENT

This invention relates to earth-classifying, vibrating screens of the class transported and driven by a motorcycle as an attachment thereto.

At the present time it is common practice among artifact hunters, prospectors, miners and others who have need to sift earth at a remote location to satisfy their equipment requirements by one of two principal methods.

One makes use of hand screens transported to the site on pack animals or motorcycles. However, use of the hand screens requires back breaking work of the most tedious sort which greatly detracts from the efficiency and enjoyment of the operation.

The other uses gasoline powered classifying equipment transported to the operating site by means of pack animals or helicopter. This obviously entails a very substantial expense, putting the activity out of the reach of many interested persons.

It is the general purpose of the present invention to provide a portable, earth-classifying, vibrating screen which may be transported to the earth-sifting site on a motorcycle and thereafter driven by the motorcycle drive unit.

It is a further object of the present invention to provide an earth-classifying, vibrating screen motorcycle attachment which is readily transportable by the motorcycle in a position in which it does not detract from the comfort of the rider nor decrease materially the carrying capacity of the vehicle.

Still a further object of the present invention is to provide an earth-classifying vibrating screen motorcycle attachment which is simple in construction, efficient in use, durable, readily adaptable for attachment to any of the more popular brands of motorcycles and easily shiftable between its use and transport positions.

Generally stated, my invention comprises a vibrating screen having at its rearward end a pair of pivotally mounted legs and at is forward end a pair of sockets. A pair of support hooks is mounted on the screen intermediate its ends.

The drive for the screen includes a shaft rotatably mounted on the motorcycle frame and having at is extremities a pair of eccentrically mounted pins dimensioned for reception in both the sockets and the hooks of the screen. Connecting means are provided for connecting the shaft to the drive wheel of the motorcycle.

Figure 1:
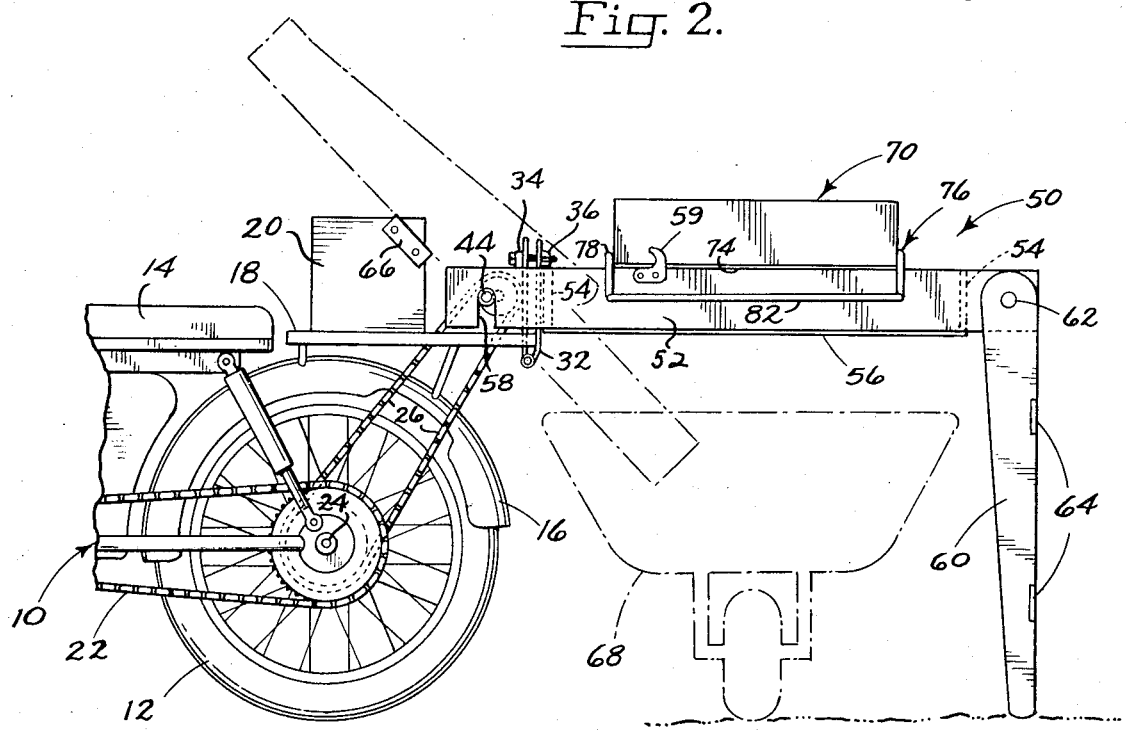

The screen may be adjusted between use and transport positions. In the use position, the screen is located with the sockets receiving the eccentric drive pins, the legs supported on the ground, and the motorcycle drive wheel connected to the drive shaft of the screen. In its transport position the drive is disconnected, and the screen pivoted upwardly with the legs folded and the hooks receiving the pins. The motorcycle thus may be used for the dual purposes of carrying the screen to and from the site and of operating it at the site. In the drawings:

FIG. 1 is a view in side elevation of the herein-described vibrating screen, earth-classifying motorcycle attachment; and FIG. 2 is a plan vie thereof.

As indicated above, the earth-classifying attachment of my invention is adapted for use with the various commercially available motorcycles. These conventionally include a frame 10 which mounts a drive wheel 12, a driver's seat 14, a rear fender 16, a luggage rack 18 mounted on the fender, and a tool or supply box 20 mounted on the rack.

Drive wheel 12 is powered in the usual manner by a motordriven chain and sprocket assembly 22 connected to rear axle 24. For the purpose of the present invention, the axle is equipped with a supplemental chain and sprocket 26 used to drive the herein described vibrating screen.

The screen is supported on a pair of hinges 32, one leaf of which is bolted or welded to a cross member 18a of rack 18. A pair of bearings 34 is bolted or otherwise affixed to the other leaf of the hinges. The two hinged leaves are adjustably interconnected by means of thumb screws 36.

Bearings 34 journal a drive shaft 40 driven by chain and sprocket assembly 26. A pair of circular plates or wheels 42 are fixed to the ends of the shafts with their planes substantially normal to the shaft axis. A pair of drive pins 44 are mounted eccentrically, one on each of the wheels. The drive pins extend outwardly with their axes substantially normal to the planes of the plates, and parallel to the axes of shaft 40.

The drive assembly thus constituted is used for vibrating a screen 50 employed for sifting or classifying the earth material. The screen consists of a pair of elongated side pieces 52 interconnected by a pair of insert end pieces 54. The frame is open at its top and closed at its bottom by means of wire cloth 56 of the selected mesh.

The lower margins of the forwardly extending portions of side pieces 52 are provided with sockets in the form of bearing slots 58. These are dimensioned to receive eccentric drive pins 44.

Side pieces 52 also mount a pair of hooks 59. Like slots 58, the hooks are dimensioned to receive eccentrically mounted drive pins 44. They are mounted on the side pieces in a location predetermined to make possible support of the screen in its inverted transport position.

The rearwardly extending end portions of side pieces 52 mount a pair of legs 60 on pivot pins 62. The legs are braced by transverse braces 64. They are adjustable between an unfolded working position in which they support the rearward end of the screen, illustrated in solid lines in FIG. 1, and a folded, transport position, illustrated in broken lines in the same figure.

The length of the screen assembly preferably is sufficient to define an area large enough to accommodate a wheelbarrow 68 beneath the screen.

To support the screen in its broken line transport position, a pair of pads 66 are provided. These may be mounted suitably on a structural support, for example, one on each side of tool box 20.

A secondary screen, indicated generally at 70, preferably is included in the assembly for the purpose of removing any large, heavy pieces of material charged to the classifier, thereby preventing damage to the relatively fine mesh wire cloth 56 used in the final sifting operation.

Secondary screen 70 may be variously constructed, but in the preferred form comprises a rectangular frame 72 dimensioned to overlie screen 50 in substantial registration therewith. Frame 72 is open at its top, but mounts across its bottom a wire mesh 74 of the selected size.

For convenience in assembly and disassembly, screen 70 is supported on screen 50 solely by gravity. This is accomplished by using legs 60 as stops and by attaching a continuous iron retaining bar 76 to the lower exterior margin of the screen frame.

The retaining bar is formed with transverse segments 78 which overlie and bear against longitudinal frame members 52 of the underlying screen and support the overlying screen thereon. It also includes connecting longitudinal segments 80, 82. These are bent downwardly so that they lie at a lower plane, providing retainer sections which prevent dislodgment of the overlying screen from the underlying screen. Longitudinal segment 82 is bent to lie outwardly from the screen frame so that it may be used as a handle.

When it is desired to transport the screen to the sifting location, legs 60 are folded and screen 50 inverted to the dashed line position of FIG. 1. In this position hooks 59 engage eccentric pins 44 and the margins of side pieces bear against pads 66. The chain of sprocket and chain assembly 26 is disconnected.

In its folded condition, the screen assembly may be transported to the operating site without interfering with the operator and without materially diminishing the load which the motorcycle can carry. In fact, it provides a convenient support to which other paraphernalia may be lashed.

At the operating site, screen 50 is inverted to its FIG. 1 full line position with pivoted legs 60 extending downwardly to support one end of the screen and notches 58 receiving eccentric pins 44 and supporting the other end of the screen. Supplemental screen 70, if used, is located gravitationally on top of screen 50. Wheelbarrow 68 is placed below the screen.

Drive chain 26 is mounted on its associated sprockets, using thumb screws 36 on hinges 32 as chain tighteners.

The rear wheel of the motorcycle is propped up on an appropriate stand and the motorcycle engine started. This operates eccentric pins 44 and induces a vibration in superimposed screens 50, 70 which thereupon may be used to sift and classify earth material shoveled into the top screen.

The labor performed by the artifact hunter, prospector or miner thus is alleviated materially. When the work is done, the sequence outlined above is reversed, putting the assembly back in the dashed line position of FIG. 1 ready for transport to a new operating base or to storage.

Having thus described my invention in preferred embodiments, I claim:

1. In combination with a motorcycle, an earth-classifying attachment comprising
   a. an earth classifying screen,
   b. mounting means mounting the forward end of the screen on a motorcycle frame or fender member,
   c. support legs pivotally connected to and supporting the rearward portion of the screen,
   d. eccentric drive means coupled to the screen, and
   e. connecting means releasably connecting the eccentric drive means to the driven wheel of the motorcycle.

2. In combination with a motorcycle, an earth-classifying attachment comprising
   a. a shaft mounted for rotation on a motorcycle frame or fender member,
   b. drive means interconnecting the shaft and the driven wheel of the motorcycle,
   c. at least one drive pin eccentrically mounted on the shaft in a plane substantially parallel thereto,
   d. classifying screen means having at least one socket at one of its ends,
   e. the socket being positioned and dimensioned for reception of the eccentrically mounted drive pin and
   f. at least one support leg pivotally attached to the other end of the classifying screen means.

3. The earth-classifying motorcycle attachment of claim 2 wherein the drive means interconnecting the shaft and the driven wheel of the motorcycle comprise chain and sprocket drive means.

4. The earth-classifying motorcycle attachment of claim 2 including a wheel fixed to the shaft at each of its ends and a drive pin mounted eccentrically on each wheel and extending outwardly therefrom in a plane parallel to the shaft, and wherein the classifying screen means has a socket on each side of one of its ends, the sockets being positioned and dimensioned for reception of the eccentric drive pins on the wheels.

5. The earth-classifying motorcycle attachment of claim 2 wherein the socket comprises a slot on the underside of the screen means and wherein the screen means is provided with a hook on its upper side, the screen means being reversible between a use position wherein the slot receives the eccentric drive pin and an inverted carrying position wherein the hook receives the drive pin.

6. The motorcycle earth-classifying attachment of claim 5 including screen means support means attached to the rear of the motorcycle behind the driver for supporting the screen means in its inverted carrying position at a predetermined angle of elevation.

7. The motorcycle earth-classifying attachment of claim 2 including a secondary screen means and support means for gravitationally supporting the same superimposed upon the first named screen means.

8. The motorcycle earth-classifying attachment of claim 7 wherein the secondary screens means comprises a rectangular frame open at the top with a screen mounted across its bottom, and a continuous retainer rod mounted about the lower margin of the frame, the rod including transverse segments bearing on the side margins of the first named screen means, and connecting longitudinal segments bearing against the sides of the first named screen means.

* * * * *